(12) United States Patent　　(10) Patent No.: US 8,996,361 B2
Peng et al.　　(45) Date of Patent: Mar. 31, 2015

(54) METHOD AND DEVICE FOR DETERMINING A DECODING MODE OF IN-BAND SIGNALING

(75) Inventors: Nian Peng, Shanghai (CN); Congli Mao, Shanghai (CN); Zhiqun Chen, Shanghai (CN); Nian Chen, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 218 days.

(21) Appl. No.: 13/486,825

(22) Filed: Jun. 1, 2012

(65) Prior Publication Data

US 2012/0239386 A1　　Sep. 20, 2012

Related U.S. Application Data

(63) Continuation of application No. PCT/CN2010/078742, filed on Nov. 15, 2010.

(30) Foreign Application Priority Data

Dec. 8, 2009 (CN) .......................... 2009 1 0252080

(51) Int. Cl.
*H04L 1/00* (2006.01)
*H04W 28/04* (2009.01)

(52) U.S. Cl.
CPC ............ *H04L 1/0014* (2013.01); *H04L 1/0038* (2013.01); *H04L 1/0046* (2013.01); *H04W 28/04* (2013.01)
USPC ....................................................... 704/201

(58) Field of Classification Search
USPC ....................................................... 704/201
See application file for complete search history.

(56) References Cited

U.S. PATENT DOCUMENTS

| 6,058,359 | A | 5/2000 | Hagen et al. |
| 6,256,487 | B1 | 7/2001 | Bruhn |
| 6,917,629 | B1 | 7/2005 | Ramesh et al. |
| 8,468,244 | B2 * | 6/2013 | Redlich et al. ................. 709/225 |

(Continued)

FOREIGN PATENT DOCUMENTS

| CN | 1292913 A | 4/2001 |
| CN | 1579049 A | 2/2005 |

(Continued)

OTHER PUBLICATIONS

Written Opinion of the International Searching Authority dated Feb. 24, 2011 in connection with International Patent Application No. PCT/CN2010/078742, 6 pages.

(Continued)

*Primary Examiner* — Susan McFadden

(57) ABSTRACT

In the field of communications, a method and a device for determining a decoding mode of in-band signaling are provided, which improve accuracy of in-band signaling decoding. The method includes: calculating a probability of each decoding mode of in-band signaling of a received signal at a predetermined moment by using a posterior probability algorithm; and from the calculated probabilities of the decoding modes, selecting a decoding mode having a maximum probability value as a decoding mode of the in-band signaling of the received signal at the predetermined moment. The method and the device are mainly used in a process for determining a decoding mode of in-band signaling in a speech frame transmission process.

11 Claims, 4 Drawing Sheets

(56) References Cited

U.S. PATENT DOCUMENTS

| | | |
|---|---|---|
| 2002/0131532 A1 | 9/2002 | Chi et al. |
| 2004/0185886 A1 | 9/2004 | Matsumoto |
| 2006/0281485 A1 | 12/2006 | Johnson et al. |
| 2007/0217626 A1* | 9/2007 | Sharma et al. ............ 381/100 |
| 2009/0319873 A1 | 12/2009 | Doi et al. |

FOREIGN PATENT DOCUMENTS

| | | |
|---|---|---|
| CN | 1756352 A | 4/2006 |
| CN | 101719814 A | 6/2010 |

OTHER PUBLICATIONS

Supplementary European Search Report dated Jul. 5, 2012 in connection with European Patent Application No. EP 10 83 5439.

International Search Report dated Feb. 24, 2011 in connection with International Patent Application No. PCT/CN2010/078742.

* cited by examiner

METHOD AND DEVICE FOR DETERMINING A DECODING MODE OF IN-BAND SIGNALING

CROSS-REFERENCE TO RELATED APPLICATIONS

This application is a continuation of International Application No. PCT/CN2010/078742, filed on Nov. 15, 2010, which claims priority to Chinese Patent Application No. 200910252080.9, filed on Dec. 8, 2009, both of which are hereby incorporated by reference in their entireties.

TECHNICAL FIELD

The present invention relates to the field of communications, and in particular, to a method and a device for determining a decoding mode of in-band signaling.

BACKGROUND

A technology for an AMR (Adaptive Multi-Rate, adaptive multi-rate) speech encoder to perform adaptive switching according to a channel condition includes two aspects: adaptation of a channel mode, and adaptation of a source encoding mode and a channel encoding mode.

Adaptive switching of the channel mode is stable, where the switching is performed only when a call connection is established between the encoder and a system or the encoder enters a new cell. That is to say, each time when a call connection is established between the encoder and the system or the encoder enters a new cell, a network allocates a fixed channel rate mode to two communicating parties according to the channel condition, where the fixed channel rate mode which is either a full speed channel mode or a half speed channel mode. Once the channel mode is determined, no switching occurs in a call process, and then adaptive switching of the source encoding mode and the channel encoding mode is performed according to the determined channel mode and channel quality in the call process. The adaptation of the source encoding mode and the channel encoding mode is adjusted mainly through a CMR (Codec Mode Request, codec mode request) of a downlink and a CMC (Codec Mode Command, codec mode command) of an uplink.

An MS (Mobile Station, mobile station) continuously detects the channel quality, determines an encoding mode of the downlink according to the channel quality, and sends the downlink CMR to a BSS (Base Station Sub-system, base station sub-system). After receiving the request, the BSS combines CMI (Codec Mode Indication, codec mode indication) data and corresponding encoding mode data to form an AMR speech frame according to the CMR and transmits the AMR speech frame to the MS in the downlink. After receiving a signal, a receiving terminal of the MS first decodes the CMI and decodes a speech part according to a speech encoding mode indicated by the CMI.

The AMR speech frame is generally classified to an AFS speech frame and an AHS speech frame according to different channel modes. Each AFS speech frame includes 8-bit InBand (in-band) signaling encoded data, which is obtained by encoding 2-bit CMI data. Each AHS speech frame includes 4-bit in-band signaling encoded data, which is obtained by encoding the 2-bit CMI data.

In the prior art, encoded bits of the received InBand signaling are decoded by using a maximum likelihood function, where sent encoded bits are correlated with decoded bits of a received signal and then the correlation values are sorted in order, and a mode through which a maximum correlation value is obtained is a decoding mode of in-band signaling.

During the implementation of the in-band signaling decoding, the inventors find that the prior art has at least the following problems. Currently, in-band signaling data is not often changed, and when it is required to determine the decoding mode of the in-band signaling, the decoding mode of the in-band signaling is determined only by correlating the sent encoded bits with the decoded bits of the received signal, which causes that accuracy of the in-band signaling decoding is low.

SUMMARY

Embodiments of the present invention provide a method and a device for determining a decoding mode of in-band signaling, which improve accuracy of in-band signaling decoding.

In order to achieve the foregoing objectives, the embodiments of the present invention adopt the following technical solutions.

A method for determining a decoding mode of in-band signaling includes:

calculating a probability of each decoding mode of in-band signaling of a received signal at a predetermined moment by using a posterior probability algorithm; and selecting, from calculated probabilities of decoding modes, a decoding mode having a maximum probability value as a decoding mode of the in-band signaling of the received signal at the predetermined moment.

A device for determining a decoding mode of in-band signaling includes:

a calculating unit, configured to calculate a probability of each decoding mode of in-band signaling of a received signal at a predetermined moment by using a posterior probability algorithm; and a selecting unit, configured to, select, from calculated probabilities of decoding modes, a decoding mode having a maximum probability value as a decoding mode of the in-band signaling of the received signal at the predetermined moment.

In the technical solutions of the present invention, the probability of each decoding mode of the in-band signaling of the received signal at the predetermined moment is calculated by using the posterior probability algorithm, and the decoding mode having the maximum probability value is selected as the decoding mode of the in-band signaling of the received signal at the predetermined moment. Since calculation of the posterior probability depends on a priori probability of the decoding mode of the in-band signaling, the probability that is of each decoding mode of in-band signaling and is obtained according to the posterior probability algorithm is obtained by synthesizing the priori probability and the posterior probability of the decoding mode of the in-band signaling of the received signal, so that accuracy of selecting the decoding mode corresponding to the maximum probability value as the decoding mode of the in-band signaling of the received signal at the predetermined moment is high, and the data obtained by decoding the in-band signaling through the selected decoding mode of the in-band signaling is relatively accurate, thereby improving accuracy of the in-band signaling decoding.

DETAILED DESCRIPTION

Embodiment 1

Figure 1:
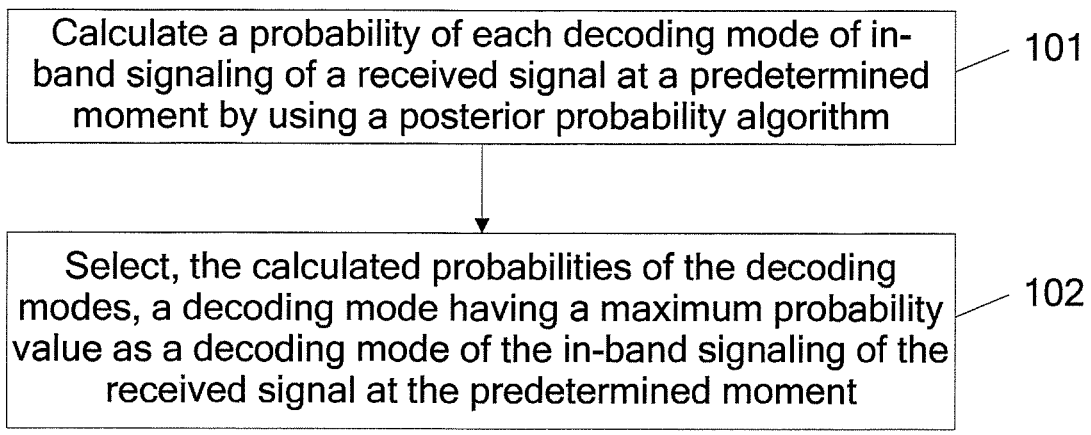
FIG. 1 is a flowchart of a method for determining a decoding mode of in-band signaling according to Embodiment 1 of the present invention.

The embodiment of the present invention provides a method for determining a decoding mode of in-band signaling. As shown in FIG. 1, the method includes the following steps.

101: Calculate a probability of each decoding mode of in-band signaling of a received signal at a predetermined moment by using a posterior probability algorithm.

The calculating the probability of each decoding mode of the in-band signaling of the received signal at the predetermined moment by using the posterior probability algorithm specifically includes the following steps.

First, a formula (1.1) for calculating the probability of the decoding mode of the in-band signaling of the received signal at the predetermined moment is obtained according to a posterior probability principle:

$$p(st_k = m \mid r_k) = \frac{p(r_k \mid st_k = m)p(st_k = m)}{p(r_k)}, \quad (1.1)$$

where $st_k=m$, $m=0, 1, 2, 3$, which is one of four in-band signaling decoding modes at a moment k, and $r_k$ is a received signal vector.

Secondly, a formula (1.2) is obtained by taking logarithms of two sides of the probability formula (1.1):

$$\ln p(st_k=m\mid r_k)=\ln p(r_k\mid st_k=m)+\ln p(st_k=m)-\ln p(r_k) \quad (1.2).$$

$\ln p(r_k)$ has the same effect on sorting of probabilities of the four in-band signaling decoding modes. Therefore, for the purpose of simplifying the calculation process, $\ln p(r_k)$ may be first omitted in the calculation process, and the formula (1.2) equals the following formula (1.3):

$$\ln p(st_k=m\mid r_k) \Leftrightarrow \ln p(r_k\mid st_k=m)+\ln p(st_k=m) \quad (1.3).$$

After the logarithms of the two sides of the probability formula (1.1) of the decoding mode of the in-band signaling of the received signal at the predetermined moment are taken and simplification and equalization are performed, the probability formula (1.3) is simplified according to a relationship between the received signal and a demodulated soft value to obtain a simplified probability formula (1.4):

$$\ln p(st_k = m \mid r_k) \Leftrightarrow \frac{\sum_{i=0}^{3} \lambda_{ki} s_{ki}}{2} + \ln p(st_k = m), \quad (1.4)$$

where $st_k=m$, $m=0, 1, 2, 3$, which is one of four in-band signaling decoding modes at a moment k, $\lambda$ is a demodulated soft value of the received signal, and s is encoded data of a sent signal. A relationship between the demodulated soft value and the received signal is $$r_k = \frac{\lambda_k \sigma^2}{2}, \text{ and } \frac{r_k s_k}{\sigma^2} \text{ equals } \frac{\lambda_k s_k}{2}.$$

After the simplified probability formula (1.4) is obtained, a logarithmic priori probability of the decoding mode of the in-band signaling of the received signal at the predetermined moment needs to be calculated, and the logarithmic priori probability is substituted into the simplified probability formula (1.4) to obtain the probability of the corresponding decoding mode of the received signal at the predetermined moment.

102: From the calculated probabilities of the decoding modes, select a decoding mode having a maximum probability value as a decoding mode of the in-band signaling of the received signal at the predetermined moment.

Figure 2:
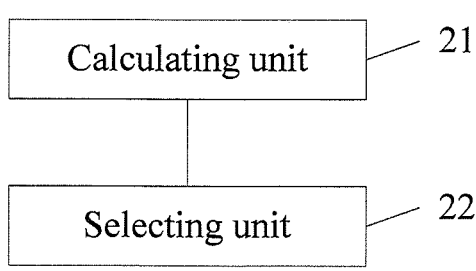
FIG. 2 is a block diagram of a device for determining a decoding mode of in-band signaling according to Embodiment 1 of the present invention.

The embodiment of the present invention provides a device for determining a decoding mode of in-band signaling. As shown in FIG. 2, the device includes a calculating unit 21 and a selecting unit 22.

The calculating unit 21 is configured to calculate a probability of each decoding mode of in-band signaling of a received signal at a predetermined moment by using a posterior probability algorithm. The selecting unit 22 is configured to select, from the probabilities of the decoding modes calculated by the calculating unit 21, a decoding mode having a maximum probability value as a decoding mode of the in-band signaling of the received signal at the predetermined moment.

The calculating, by the calculating unit 21, the probability of each decoding mode of the in-band signaling of the received signal at the predetermined moment by using the posterior probability algorithm specifically includes: obtaining, according to a posterior probability principle, a formula (1.1) for calculating the probability of the decoding mode of the in-band signaling of the received signal at the predetermined moment:

$$p(st_k = m\mid r_k) = \frac{p(r_k\mid st_k = m)p(st_k = m)}{p(r_k)}, \quad (1.1)$$

where $st_k=m$, $m=0, 1, 2, 3$, which is one of four in-band signaling decoding modes at a moment k, and $r_k$ is a received signal vector. Logarithms of two sides of the probability formula are taken, and the probability formula is simplified according to a relationship between the received signal and a demodulated soft value to obtain a simplified probability formula (1.4):

$$\ln p(st_k = m\mid r_k) \Leftrightarrow \frac{\sum_{i=0}^{3} \lambda_{ki} s_{ki}}{2} + \ln p(st_k = m), \quad (1.4)$$

where $st_k=m$, $m=0, 1, 2, 3$, which is one of four in-band signaling decoding modes at a moment k, $\lambda$ is a demodulated soft value of the received signal, and s is encoded data of a sent signal. A logarithmic priori probability of the decoding mode of the in-band signaling of the received signal at the predetermined moment is calculated, and the logarithmic priori probability is substituted into the simplified probability formula (1.4) to obtain the probability of the corresponding decoding mode of the received signal at the predetermined moment.

In the embodiment of the present invention, the probability of each decoding mode of the in-band signaling of the received signal at the predetermined moment is calculated by using the posterior probability algorithm, and the decoding mode having the maximum probability value is selected as the decoding mode of the in-band signaling of the received signal at the predetermined moment. Since calculation of the posterior probability depends on a priori probability of the decoding mode of the in-band signaling, the probability of each in-band signaling decoding mode obtained according to the posterior probability algorithm is obtained by synthesizing the priori probability and the posterior probability of the decoding mode of the in-band signaling of the received signal, so that accuracy of selecting the decoding mode corresponding to the maximum probability value as the decoding mode of the in-band signaling of the received signal at the predetermined moment is high, and data obtained by decoding the in-band signaling through the selected decoding mode of the in-band signaling is relatively accurate, thereby improving accuracy of the in-band signaling decoding.

Embodiment 2

Figure 3:
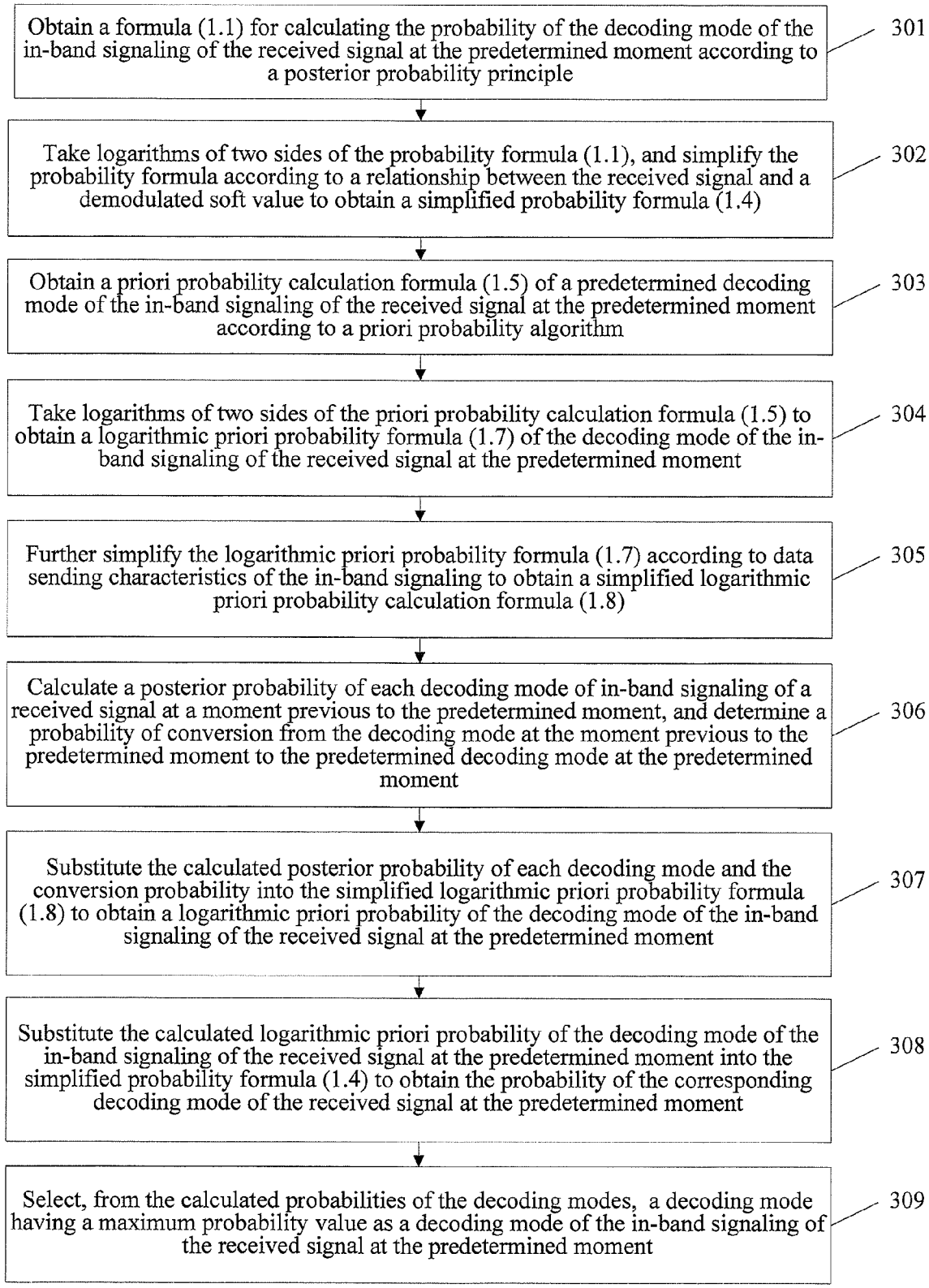
FIG. 3 is a flowchart of a method for determining a decoding mode of in-band signaling according to Embodiment 2 of the present invention.

The embodiment of the present invention provides a method for determining a decoding mode of in-band signaling. As shown in FIG. 3, the method includes the following steps.

First, a probability of each decoding mode of in-band signaling of a received signal at a predetermined moment is calculated by using a posterior probability algorithm. After the probability of each decoding mode of in-band signaling of the received signal at the predetermined moment is obtained, a decoding mode having a maximum probability value is selected, from the calculated probabilities of the decoding modes, as a decoding mode of the in-band signaling of the received signal at the predetermined moment. The method specifically includes the following steps.

301: Obtain, according to a posterior probability principle, a formula (1.1) for calculating the probability of the decoding mode of the in-band signaling of the received signal at the predetermined moment:

$$p(st_k = m|r_k) = \frac{p(r_k|st_k = m)p(st_k = m)}{p(r_k)}, \quad (1.1)$$

where $st_k$=m, m=0, 1, 2, 3, which is one of four in-band signaling decoding modes at a moment k, and $r_k$ is a received signal vector.

302: Take logarithms of two sides of the probability formula (1.1), and simplify the probability formula according to a relationship between the received signal and a demodulated soft value to obtain a simplified probability formula (1.4):

$$\ln p(st_k = m|r_k) \Leftrightarrow \frac{\sum_{i=0}^{3} \lambda_{ki} s_{ki}}{2} + \ln p(st_k = m), \quad (1.4)$$

where $st_k$=m, m=0, 1, 2, 3, which is one of four in-band signaling decoding modes at a moment k, $\lambda$ is a demodulated soft value of the received signal, and s is encoded data of a sent signal.

A specific process for taking the logarithms of the two sides of the probability formula (1.1) and simplifying the probability formula according to the relationship between the received signal and the demodulated soft value to obtain the simplified probability formula includes: taking the logarithms of the two sides of the probability formula (1.1) to obtain the following formula (1.2):

$$\ln p(st_k=m|r_k)=\ln p(r_k|st_k=m)+\ln p(st_k=m)-\ln p(r_k) \quad (1.2).$$

$\ln p(r_k)$ has the same effect on sorting of probabilities of four in-band signaling decoding modes. Therefore, for the purpose of simplifying the calculation process, $\ln p(r_k)$ may be first omitted in the calculation process, and the formula (1.2) equals the following formula (1.3):

$$\ln p(st_k=m|r_k) \Leftrightarrow \ln p(r_k|st_k=m)+\ln p(st_k=m) \quad (1.3).$$

After the logarithms of the two sides of the probability formula (1.1) of the decoding mode of the in-band signaling of the received signal at the predetermined moment are taken and simplification and equalization are performed, the probability formula (1.3) is simplified according to the relationship between the received signal and the demodulated soft value to obtain the simplified probability formula (1.4):

$$\ln p(st_k = m|r_k) \Leftrightarrow \frac{\sum_{i=0}^{3} \lambda_{ki} s_{ki}}{2} + \ln p(st_k = m), \quad (1.4)$$

where $st_k$=m, m=0, 1, 2, 3, which is one of four in-band signaling decoding modes at a moment k, $\lambda$ is a demodulated soft value of the received signal, and s is encoded data of a sent signal. A relationship between the demodulated soft value and the received signal is $$r_k = \frac{\lambda_k \sigma^2}{2}, \text{ and } \frac{r_k s_k}{\sigma^2} \text{ equals } \frac{\lambda_k s_k}{2}.$$

After the simplified probability formula (1.4) is obtained according to the relationship between the demodulated soft value and the received signal, since $\lambda$ and s are known, as long as a logarithmic priori probability $\ln p(st_k=m)$ of the decoding mode of the in-band signaling of the received signal at the determined moment k is calculated, and the logarithmic priori probability is substituted into the simplified probability formula (1.4), the probability of the corresponding decoding mode of the received signal at the predetermined moment k can be obtained. Therefore, after the simplified probability formula (1.4) is obtained, step 303 needs to be performed.

303: Obtain a priori probability calculation formula (1.5) of a predetermined decoding mode of the in-band signaling of the received signal at the predetermined moment according to a priori probability algorithm:

$$p(st_k=m)=p_{0m}p(st_{k-1}=0|r_{k-1})+p_{1m}p(st_{k-1}=1|r_{k-1})+p_{2m}p(st_{k-1}=2|r_{k-1})+p_{3m}p(st_{k-1}=3|r_{k-1}) \quad (1.5),$$

where $r_k$ is a received signal vector, $st_{k-1}$=m, $st_k$=m, m=0, 1, 2, 3, $st_k$ is one of four in-band signaling decoding modes at the moment k, $st_{k-1}$ is one of four in-band signaling decoding modes at a moment k−1, $p_{0m}$, $p_{1m}$, $p_{2m}$, and $p_{3m}$ are probabilities of conversion from four decoding modes 0, 1, 2, and 3 at the moment k−1 to mode m at the moment k respectively, and $p(st_k=m)$ is a priori probability when the decoding mode at the moment k is mode m.

Since 2-bit CMI, CMC, and CMR can represent four in-band signaling decoding modes 0, 1, 2, and 3, conversion between the decoding modes has a certain regular. Mode 0 can only be converted to mode 0 and mode 1, mode 1 can be converted to mode 0, mode 1, and mode 2, mode 2 can only be converted to mode 1, mode 2, and mode 3, and mode 3 can only be converted to mode 2 and mode 3, where a situation of cross-mode jump of in-band signaling is not supported. The embodiment of the present invention also supports the cross-mode jump of in-band signaling. The probability of conversion between the decoding modes is shown in the following matrix:

$$H = \begin{pmatrix} p_{00} & p_{01} & p_{02} & p_{03} \\ p_{10} & p_{11} & p_{12} & p_{13} \\ p_{20} & p_{21} & p_{22} & p_{23} \\ p_{30} & p_{31} & p_{32} & p_{33} \end{pmatrix},$$

where $p_{ij}$ is a probability of conversion from mode i to mode j, i=1, 2, 3, 4, and j=1, 2, 3, 4.

In the embodiment of the present invention, the calculating a priori probability of in-band decoding mode 0 is taken as an example to specifically describe a calculation process of a priori probability formula. Probabilities of four modes at the moment k are as follows:

$$p(st_K=m) = p(st_{K-1}=m|r_{k-1})H \quad (1.6),$$

where a mode vector $p(st_k=m)=(p(st_k=0)\ p(st_k=1)\ p(st_k=2)\ p(st_k=3))$, a probability when a decoding mode of in-band signaling of a receiving channel at a moment k is 0 is equal to a sum of probabilities when four in-band signaling decoding modes at a moment k−1 are converted to mode 0. Posterior probabilities of the four in-band signaling decoding modes at the moment k−1 are $(p(st_{k-1}=0|r_{k-1})\ p(st_{k-1}=1|r_{k-1})\ p(st_{k-1}=2|r_{k-1})\ p(st_{k-1}=3|r_{k-1}))$. From the moment k−1 to the moment k, according to the probability matrix H, it is obtained that, a probability of converting mode 0 to mode 0 is $p_{00}$, a probability of converting mode 1 to mode 0 is $p_{10}$, a probability of converting mode 2 to mode 0 is $p_{20}$, and a probability of converting mode 3 to mode 0 is $p_{30}$. Therefore, according to the formula (1.6), the probability when the mode at the moment k is 0 is as follows:

$$p(st_k=0)=p_{00}p(st_{k-1}=0|r_{k-1})+p_{10}p(st_{k-1}=1|r_{k-1})+p_{20}p(st_{k-1}=2|r_{k-1})+p_{30}p(st_{k-1}=3|r_{k-1}).$$

304: Take logarithms of two sides of the priori probability calculation formula (1.5) to obtain a logarithmic priori probability formula (1.7) of the decoding mode of the in-band signaling of the received signal at the predetermined moment:

$$\ln p(st_k=m)=\max(lp_{0m}+\ln p(st_{k-1}=0|r_{k-1}), \ln p_{1m}+\ln p(st_{k-1}=1|r_{k-1}), \ln p_{2m}+\ln p(st_{k-1}=2|r_{k-1}), \ln p_{3m}+\ln p(st_{k-1}=3|r_{k-1})) \quad (1.7).$$

where $st_k=m$, m=0, 1, 2, 3, which is one of four in-band signaling decoding modes at a moment k, and $r_k$ is a received signal vector.

305: In a case that cross-mode jump of the in-band signaling is not supported, further simplify the logarithmic priori probability formula (1.7) according to data sending characteristics of the in-band signaling to obtain a simplified logarithmic priori probability calculation formula (1.8):

$$\ln p(st_k=0)=\max(\ln p_{00}+\ln p(st_{k-1}=0|r_{k-1})\ln p_{10}+\ln p(st_{k-1}=1|r_{k-1}))$$

$$\ln p(st_k=1)=\max(\ln p_{01}+\ln p(st_{k-1}=0|r_{k-1})\ln p_{11}+\ln p(st_{k-1}=1|r_{k-1})\ln p_{21}+\ln p(st_{k-1}=2|r_{k-1}))$$

$$\ln p(st_k=2)=\max(\ln p_{12}+\ln p(st_{k-1}=1|r_{k-1})\ln p_{22}+\ln p(st_{k-1}=2|r_{k-1})\ln p_{32}+\ln p(st_{k-1}=3|r_{k-1}))$$

$$\ln p(st_k=3)=\max(\ln p_{23}+\ln p(st_{k-1}=2|r_{k-1})\ln p_{33}+\ln p(st_{k-1}=3|r_{k-1})) \quad (1.8),$$

where $st_k=m$, m=0, 1, 2, 3, which is one of four in-band signaling decoding modes at a moment k, and $r_k$ is a received signal vector.

In a case that the cross-mode jump of the in-band signaling is supported, the following logarithmic priori probability calculation formula is obtained according to the data sending characteristics of the in-band signaling and the logarithmic priori probability formula (1.7):

$$\ln p(st_k=0)=\max(\ln p_{00}+\ln p(st_{k-1}=0|r_{k-1})\ln p_{10}+\ln p(st_{k-1}=1|r_{k-1})\ln p_{20}+\ln p(st_{k-1}=2|r_{k-1})\ln p_{30}+\ln p(st_{k-1}=3|r_{k-1}))$$

$$\ln p(st_k=1)=\max(\ln p_{01}+\ln p(st_{k-1}=0|r_{k-1})\ln p_{11}+\ln p(st_{k-1}=1|r_{k-1})\ln p_{21}+\ln p(st_{k-1}=2|r_{k-1})\ln p_{31}+\ln p(st_{k-1}=3|r_{k-1}))$$

$$\ln p(st_k=2)=\max(\ln p_{02}+\ln p(st_{k-1}=0|r_{k-1})\ln p_{12}+\ln p(st_{k-1}=1|r_{k-1})\ln p_{22}+\ln p(st_{k-1}=2|r_{k-1})\ln p_{32}+\ln p(st_{k-1}=3|r_{k-1}))$$

$$\ln p(st_k=3)=\max(\ln p_{03}+\ln p(st_{k-1}=0|r_{k-1})\ln p_{13}+\ln p(st_{k-1}=1|r_{k-1})\ln p_{32}+\ln p(st_{k-1}=2|r_{k-1})\ln p_{33}+\ln p(st_{k-1}=3|r_{k-1})) \quad (1.8.1).$$

306: Calculate a posterior probability, $p(st_{K-1}=m|r_{K-1})$, of each decoding mode of in-band signaling of a received signal at a moment previous to the predetermined moment, and determine a probability $p_{ij}$ of conversion from the decoding mode at the moment previous to the predetermined moment to the predetermined decoding mode at the predetermined moment.

The calculating the posterior probability of each decoding mode of the in-band signaling of the received signal at the moment previous to the predetermined moment specifically includes the following two methods.

In the first method, a decoding mode of the in-band signaling of the received signal at the moment previous to the predetermined moment is specified, a posterior probability of the specified decoding mode is set to 1, and posterior probabilities of decoding modes other than the specified decoding mode are set to 0. In the second method, the posterior probability of each decoding mode of the in-band signaling of the received signal at the moment previous to the predetermined moment is calculated according to a posterior probability principle.

In the embodiment of the present invention, a specific process for calculating the posterior probability of each decoding mode of the in-band signaling of the received signal at the moment previous to the predetermined moment is specifically described through the first method, which includes that: it is assumed that a mode detected at the moment k−1 is 0, a posterior probability of the mode is set to 1, and posterior probabilities of other modes are set to 0, that is, $p(st_{k-1}=0|r_{k-1})=1$, $p(st_{k-1}=1|r_{k-1})=0$, $p(st_{k-1}=2|r_{k-1})=0$, and $p(st_{k-1}=3|r_{k-1})=0$. The foregoing values are substituted into the formula (1.8) or (1.8.1), and a priori probability logarithm of in-band decoding mode 0 of the received signal at the moment k is: $\ln p(st_k=0)=\max(\ln p_{00}-\infty-\infty-\infty)=\ln p_{00}$. The formula (1.7) is simplified into the following formula (1.9):

$$\ln p(st_k=m)=\ln p_{0m} \quad (1.9).$$

307: Substitute the calculated posterior probability of each decoding mode and the probability of conversion into the simplified logarithmic priori probability formula (1.8) or (1.8.1) to obtain a logarithmic priori probability of the decoding mode of the in-band signaling of the received signal at the predetermined moment.

308: Substitute the calculated logarithmic priori probability of the decoding mode of the in-band signaling of the received signal at the predetermined moment into the simplified probability formula (1.4) to obtain the probability of the corresponding decoding mode of the received signal at the predetermined moment.

309: From the calculated probabilities of the decoding modes, select a decoding mode having a maximum probability value as a decoding mode of the in-band signaling of the received signal at the predetermined moment.

Figure 4:
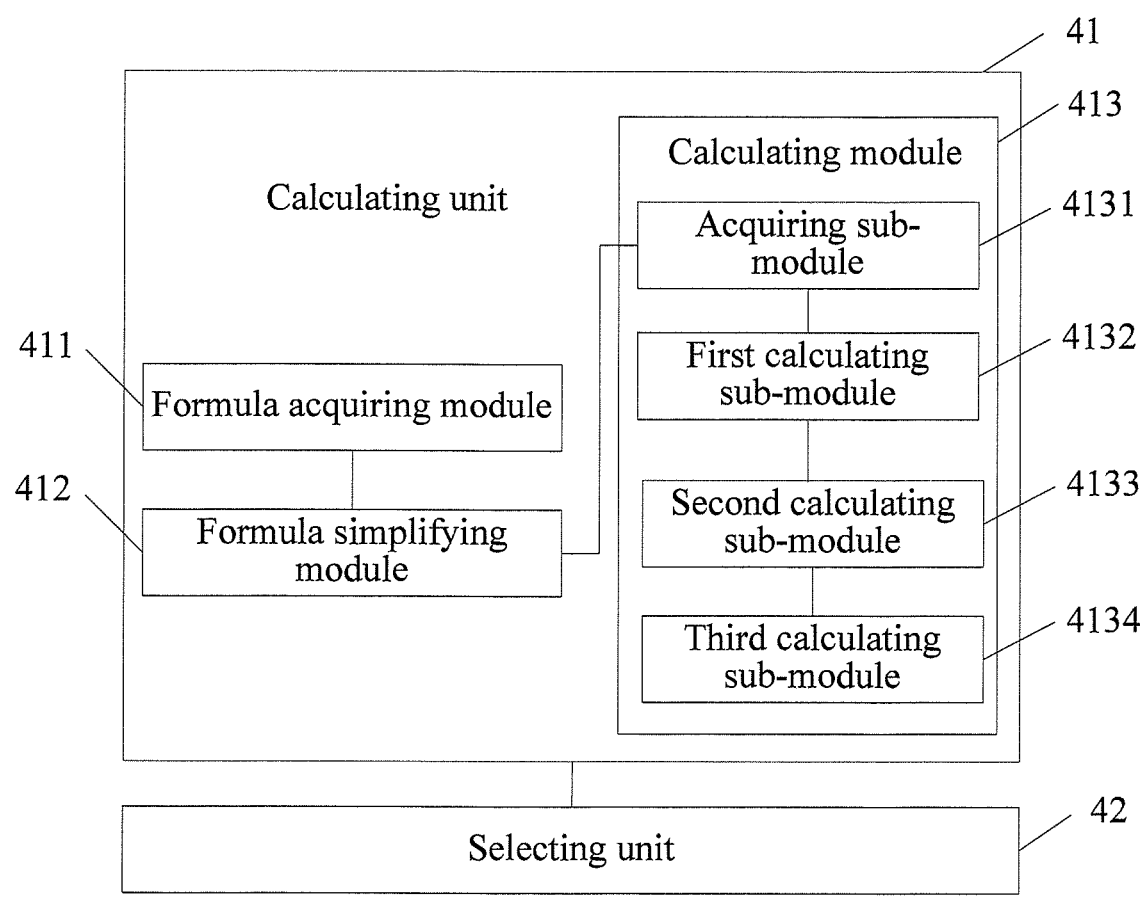
FIG. 4 is a block diagram of a device for determining a decoding mode of in-band signaling according to Embodiment 2 of the present invention.
Figure 5:
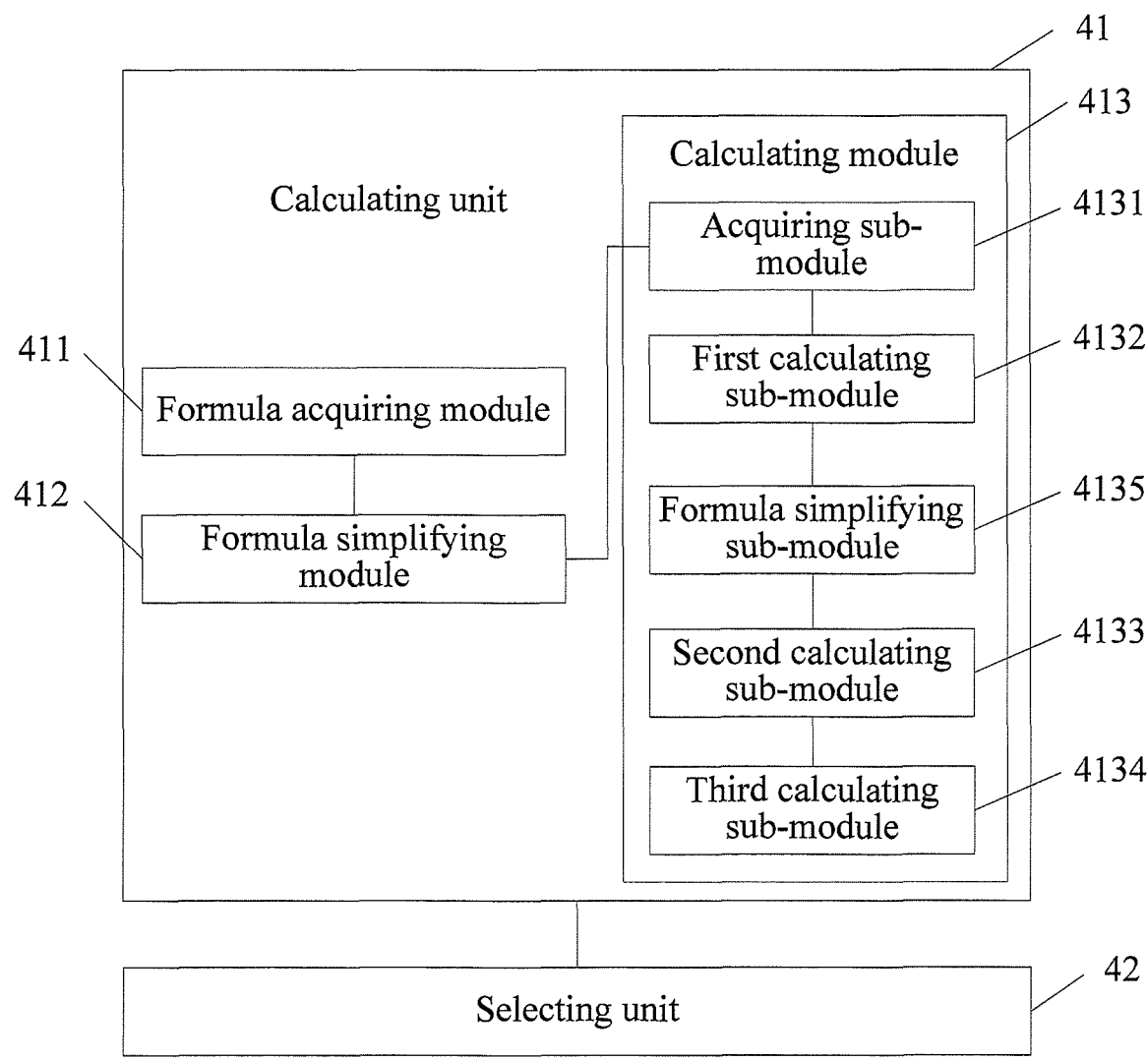
FIG. 5 is a block diagram of another device for determining a decoding mode of in-band signaling according to Embodiment 2 of the present invention.

The embodiment of the present invention further provides a device for determining a decoding mode of in-band signaling. As shown in FIG. 4, the device includes a calculating unit 41 and a selecting unit 42.

The calculating unit 41 is configured to calculate a probability of each decoding mode of in-band signaling of a received signal at a predetermined moment by using a posterior probability algorithm. The selecting unit 42 is configured to select, from the probabilities of the decoding modes calculated by the calculating unit 41, a decoding mode having a maximum probability value as a decoding mode of the in-band signaling of the received signal at the predetermined moment.

The calculating unit 41 includes a formula acquiring module 411, a formula simplifying module 412, and a calculating module 413.

The formula acquiring module 411 is configured to obtain, according to a posterior probability principle, a probability formula (1.1) for calculating the probability of the decoding mode of the in-band signaling of the received signal at the predetermined moment:

$$p(st_k = m|r_k) = \frac{p(r_k|st_k = m)p(st_k = m)}{p(r_k)}, \quad (1.1)$$

where $st_k = m$, $m = 0, 1, 2, 3$, which is one of four in-band signaling decoding modes at a moment k, and $r_k$ is a received signal vector.

The formula simplifying module 412 is configured to take logarithms of two sides of the probability formula (1.1) acquired by the formula acquiring module 411, and simplify the probability formula according to a relationship between the received signal and a demodulated soft value to obtain a simplified probability formula (1.4):

$$\ln p(st_k = m|r_k) \Leftrightarrow \frac{\sum_{i=0}^{3} \lambda_{ki} s_{ki}}{2} + \ln p(st_k = m), \quad (1.4)$$

where $st_k = m$, $m = 0, 1, 2, 3$, which is one of four in-band signaling decoding modes at a moment k, $\lambda$ is a demodulated soft value of the received signal, and s is encoded data of a sent signal.

A specific process for the formula simplifying module 412 to take the logarithms of the two sides of the probability formula (1.1) and simplify the probability formula according to the relationship between the received signal and the demodulated soft value to obtain the simplified probability formula (1.4) includes: taking the logarithms of the two sides of the probability formula (1.1) to obtain the following formula (1.2):

$$\ln p(st_k = m|r_k) = \ln p(r_k|st_k = m) + \ln p(st_k = m) - \ln p(r_k) \quad (1.2).$$

$\ln p(r_k)$ has the same effect on sorting of probabilities of four in-band signaling decoding modes. Therefore, for the purpose of simplifying the calculation process, $\ln p(r_k)$ may be first omitted in the calculation process, and the formula (1.2) equals the following formula (1.3) accordingly:

$$\ln p(st_k = m|r_k) \Leftrightarrow \ln p(r_k|st_k = m) + \ln p(st_k = m) \quad (1.3).$$

After the logarithms of the two sides of the probability formula (1.1) of the decoding mode of the in-band signaling of the received signal at the predetermined moment are taken and simplification and equalization are performed, the probability formula (1.3) is simplified according to the relationship between the received signal and the demodulated soft value to obtain the simplified probability formula (1.4):

$$\ln p(st_k = m|r_k) \Leftrightarrow \frac{\sum_{i=0}^{3} \lambda_{ki} s_{ki}}{2} + \ln p(st_k = m), \quad (1.4)$$

where $st_k = m$, $m = 0, 1, 2, 3$, which is one of four in-band signaling decoding modes at a moment k, $\lambda$ is a demodulated soft value of the received signal, and s is encoded data of a sent signal. A relationship between the demodulated soft value and the received signal is $$r_k = \frac{\lambda_k \sigma^2}{2}, \text{ and } \frac{r_k s_k}{\sigma^2} \text{ equals } \frac{\lambda_k s_k}{2}.$$

The calculating module 413 is configured to calculate a logarithmic priori probability of the decoding mode of the in-band signaling of the received signal at the predetermined moment, and substitute the logarithmic priori probability into the probability formula (1.4) simplified by the formula simplifying module 412 to obtain the probability of the corresponding decoding mode of the received signal at the predetermined moment.

Furthermore, the calculating module 413 includes an acquiring sub-module 4131, a first calculating sub-module 4132, a second calculating sub-module 4133, and a third calculating sub-module 4134.

The acquiring sub-module 4131 is configured to obtain a priori probability calculation formula (1.5) of a predetermined decoding mode of the in-band signaling of the received signal at the predetermined moment according to a priori probability algorithm:

$$p(st_k = m) = p_{0m} p(st_{k-1} = 0|r_{k-1}) + p_{1m} p(st_{k-1} = 1|r_{k-1}) + p_{2m} p(st_{k-1} = 2|r_{k-1}) + p_{3m} p(st_{k-1} = 3|r_{k-1}) \quad (1.5),$$

where $r_k$ is a received signal vector, $st_{k-1} = m$, $st_k = m$, $m = 0, 1, 2, 3$, $st_k$ is one of four in-band signaling decoding modes at a moment k, $st_{k-1}$ is one of four in-band signaling decoding modes at a moment k−1, $p_{0m}$, $p_{1m}$, $p_{2m}$, and $p_{3m}$ are probabilities of conversion from four decoding modes 0, 1, 2, and 3 at the moment k−1 to mode m at the moment k respectively, and $p(st_k = m)$ is a priori probability when the decoding mode at the moment k is the mode m.

The first calculating sub-module 4132 is configured to take logarithms of two sides of the priori probability calculation formula (1.5) obtained by the acquiring sub-module 4131 to obtain a logarithmic priori probability formula (1.7) of the decoding mode of the in-band signaling of the received signal at the predetermined moment:

$$\ln p(st_k=m) = \max(\ln p_{0m} + \ln p(st_{k-1}=0|r_{k-1}), \ln p_{1m} + \ln p(st_{k-1}=1|r_{k-1}), \ln p_{2m} + \ln p(st_{k-1}=2|r_{k-1}), \ln p_{3m} + \ln p(st_{k-1}=3|r_{k-1}))$$ (1.7)

where $st_k = m$, $m = 0, 1, 2, 3$, which is one of four in-band signaling decoding modes at a moment k, and $r_k$ is a received signal vector.

The second calculating sub-module 4133 is configured to calculate a posterior probability $p(st_{K-1}=m|r_{K-1})$ of each decoding mode of in-band signaling of a received signal at a moment previous to the predetermined moment, and determine a probability $p_{ij}$ of conversion from the decoding mode at the moment previous to the predetermined moment to the predetermined decoding mode at the predetermined moment, where $p_{ij}$ is a probability of conversion from mode i to mode j, i=1, 2, 3, 4, and j=1, 2, 3, 4. The calculating, by the second calculating sub-module 4133, the posterior probability specifically includes the following two methods: specifying a decoding mode of the in-band signaling of the received signal at the moment previous to the predetermined moment; and setting a posterior probability of the specified decoding mode to 1 and setting posterior probabilities of decoding modes other than the specified decoding mode to 0; or calculating, according to a posterior probability principle, the posterior probability of each decoding mode of the in-band signaling of the received signal at the moment previous to the predetermined moment.

The third calculating sub-module 4134 is configured to substitute the posterior probability of each decoding mode and the probability of conversion calculated by the second calculating sub-module 4133 into the logarithmic priori probability formula (1.7) to obtain a logarithmic priori probability of the decoding mode of the in-band signaling of the received signal at the predetermined moment.

Furthermore, for the purpose of simplifying the process for calculating the logarithmic priori probability, after the first calculating sub-module 4132 takes the logarithms of the two sides of the priori probability calculation formula (1.5) obtained by the acquiring sub-module 4131 to obtain the logarithmic priori probability formula (1.7) of the decoding mode of the in-band signaling of the received signal at the predetermined moment, the calculating module 413 further includes a formula simplifying sub-module 4135 configured to further simplify the logarithmic priori probability formula (1.7) according to data sending characteristics of the in-band signaling in a case that cross-mode jump of in-band signaling is not supported, so as to obtain a simplified logarithmic priori probability calculation formula (1.8):

$$\ln p(st_k=0) = \max(\ln p_{00} + \ln p(st_{k-1}=0|r_{k-1}) \ln p_{10} + \ln p(st_{k-1}=1|r_{k-1}))$$

$$\ln p(st_k=1) = \max(\ln p_{01} + \ln p(st_{k-1}=0|r_{k-1}) \ln p_{11} + \ln p(st_{k-1}=1|r_{k-1}) \ln p_{21} + \ln p(st_{k-1}=2|r_{k-1}))$$

$$\ln p(st_k=2) = \max(\ln p_{12} + \ln p(st_{k-1}=1|r_{k-1}) \ln p_{22} + \ln p(st_{k-1}=2|r_{k-1}) \ln p_{32} + \ln p(st_{k-1}=3|r_{k-1}))$$

$$\ln p(st_k=3) = \max(\ln p_{23} + \ln p(st_{k-1}=2|r_{k-1}) \ln p_{33} + \ln p(st_{k-1}=3|r_{k-1}))$$ (1.8), where $st_k = m$, $m = 0, 1, 2, 3$, which is one of four in-band signaling decoding modes at a moment k, and $r_k$ is a received signal vector.

After the first calculating sub-module 4132 takes the logarithms of the two sides of the priori probability calculation formula (1.5) obtained by the acquiring sub-module 4131 to obtain the logarithmic priori probability formula (1.7) of the decoding mode of the in-band signaling of the received signal at the predetermined moment, the calculating module 413 further includes a fourth calculating sub-module configured to obtain the following logarithmic priori probability calculation formula according to the data sending characteristics of the in-band signaling and according to the logarithmic priori probability formula (1.7) in a case that cross-mode jump of the in-band signaling is supported:

$$\ln p(st_k=0) = \max(\ln p_{00} + \ln p(st_{k-1}=0|r_{k-1}) \ln p_{10} + \ln p(st_{k-1}=1|r_{k-1}) \ln p_{20} + \ln p(st_{k-1}=2|r_{k-1}) \ln p_{30} + \ln p(st_{k-1}=3|r_{k-1}))$$

$$\ln p(st_k=1) = \max(\ln p_{01} + \ln p(st_{k-1}=0|r_{k-1}) \ln p_{11} + \ln p(st_{k-1}=1|r_{k-1}) \ln p_{21} + \ln p(st_{k-1}=2|r_{k-1}) \ln p_{31} + \ln p(st_{k-1}=3|r_{k-1}))$$

$$\ln p(st_k=2) = \max(\ln p_{02} + \ln p(st_{k-1}=0|r_{k-1}) \ln p_{12} + \ln p(st_{k-1}=1|r_{k-1}) \ln p_{22} + \ln p(st_{k-1}=2|r_{k-1}) \ln p_{32} + \ln p(st_{k-1}=3|r_{k-1}))$$

$$\ln p(st_k=3) = \max(\ln p_{03} + \ln p(st_{k-1}=0|r_{k-1}) \ln p_{13} + \ln p(st_{k-1}=1|r_{k-1}) \ln p_{32} + \ln p(st_{k-1}=2|r_{k-1}) \ln p_{33} + \ln p(st_{k-1}=3|r_{k-1}))$$ (1.8.1).

where $st_k = m$, $m = 0, 1, 2, 3$, which is one of four in-band signaling decoding modes at a moment k, and $r_k$ is a received signal vector.

The third calculating sub-module 4134 is further configured to substitute the posterior probability of each decoding mode and the probability of conversion calculated by the second calculating sub-module 4133 into the logarithmic priori probability formula (1.8) or (1.8.1) simplified by the formula simplifying sub-module 4135 to obtain a logarithmic priori probability of the decoding mode of the in-band signaling of the received signal at the predetermined moment.

In the embodiment of the present invention, the probability of each decoding mode of the in-band signaling of the received signal at the predetermined moment is calculated by using the posterior probability algorithm, and the decoding mode having the maximum probability value is selected as the decoding mode of the in-band signaling of the received signal at the predetermined moment. Since the calculation of the posterior probability depends on the priori probability of the decoding mode of the in-band signaling, the probability that is of each in-band signaling decoding mode and is obtained according to the posterior probability algorithm is obtained by synthesizing the priori probability and the posterior probability of the decoding mode of the in-band signaling of the received signal, so that accuracy of selecting the decoding mode corresponding to the maximum probability value as the decoding mode of the in-band signaling of the received signal at the predetermined moment is high, and data obtained by decoding the in-band signaling through the selected decoding mode of the in-band signaling is relatively accurate, thereby improving accuracy of the in-band signaling decoding.

The embodiment of the present invention is also applicable to a process for determining a decoding mode of in-band signaling of a speech frame when data of a sending end remains unchanged or the data is not often changed.

Through the foregoing description of the embodiments, it is apparent to persons skilled in the art that the present invention may be accomplished by software plus necessary universal hardware, and definitely may also be accomplished by hardware, but in most cases, the present invention is preferably implemented by software plus necessary universal hardware. Based on this understanding, the technical solutions of the present invention or the part that makes contributions to the prior art can be substantially embodied in the form of a software product. The computer software product may be stored in a readable storage medium, for example, a floppy disk, hard disk, or optical disk of the computer, and contain several instructions used to instruct a computer apparatus (for example, a personal computer, a server, or a network apparatus) to perform the method according to the embodiments of the present invention.

The foregoing description is only the specific implementation of the present invention, but the protection scope of the present invention is not limited thereto. Any change or replacement that can be easily derived by persons skilled in the art within the technical scope disclosed by the present invention shall fall within the protection scope of the present invention. Therefore, the protection scope of the present invention shall be subject to the protection scope of the claims.

What is claimed is:

1. A method for determining a decoding mode of in-band signaling, the method comprising:
    calculating, by a mobile station, a probability of each decoding mode of in-band signaling of a signal received at the mobile station at a predetermined moment by using a posterior probability algorithm by:
        obtaining, according to a posterior probability principle, a probability formula for calculating the probability of the decoding mode of the in-band signaling of the received signal at the predetermined moment:

$$p(st_k = m | r_k) = \frac{p(r_k | st_k = m) p(st_k = m)}{p(r_k)}$$

wherein $st_k = m$, $m = 0, 1, 2, 3$, which is one of four in-band signaling decoding modes at a moment k, and $r_k$ is a received signal vector,
        taking logarithms of two sides of the probability formula, and simplifying the probability formula according to a relationship between the received signal and a demodulated soft value to obtain a simplified probability formula:

$$\ln p(st_k = m | r_k) \Leftrightarrow \frac{\sum_{i=0}^{3} \lambda_{ki} s_{ki}}{2} + \ln p(st_k = m)$$

wherein $st_k = m$, $m = 0, 1, 2, 3$, which is one of four in-band signaling decoding modes at a moment k, $\lambda$ is a demodulated soft value of the received signal, and s is encoded data of a sent signal, and
    calculating a logarithmic priori probability of the decoding mode of the in-band signaling of the received signal at the predetermined moment, and substituting the logarithmic priori probability into the simplified probability formula to obtain a probability of a corresponding decoding mode of the received signal at the predetermined moment; and
    selecting, at the mobile station, from calculated probabilities of decoding modes, a decoding mode having a maximum probability value as a decoding mode of the in-band signaling of the received signal at the predetermined moment.

2. The method for determining a decoding mode of in-band signaling according to claim 1, wherein calculating the logarithmic priori probability of each decoding mode of the in-band signaling of the received signal at the predetermined moment comprises:
    obtaining a priori probability calculation formula of a predetermined decoding mode of the in-band signaling of the received signal at the predetermined moment according to a priori probability algorithm:

$$p(st_k=m)=p_{0m}p(st_{k-1}=0|r_{k-1})+p_{1m}p(st_{k-1}=1|r_{k-1})+p_{2m}p(st_{k-1}=2|r_{k-1})+p_{3m}p(st_{k-1}=3|r_{k-1})$$

wherein $r_k$ is a received signal vector, $st_{k-1}m=0, 1, 2, 3$, $st_k$ is one of four in-band signaling decoding modes at a moment k, $st_{k-1}$ is one of four in-band signaling decoding modes at a moment k-1, $P_{0m}, P_{1m}, P_{3m}$ are probabilities of conversion from four decoding modes 0, 1, 2, and 3 at the moment k-1 to mode m at the moment k, respectively, and $p(st_k=m)$ is a priori probability when the decoding mode at the moment k is mode m;
    taking logarithms of two sides of the priori probability calculation formula to obtain a logarithmic priori probability formula of the decoding mode of the in-band signaling of the received signal at the predetermined moment:

$$\ln p(st_k=m)=\max(\ln p_{0m}+\ln p(st_{k-1}=0|r_{k-1}), \ln p_{1m}+\ln p(st_{k-1}=1|r_{k-1}),$$

$$\ln p_{2m}+\ln p(st_{k-1}=2|r_{k-1}), \ln p_{3m}+\ln p(st_{k-1}=3|r_{k-1}))$$

wherein $st_k=m$, $m=0, 1, 2, 3$, which is one of four in-band signaling decoding modes at the moment k, and $r_k$ is the received signal vector;
    calculating a posterior probability of each decoding mode of in-band signaling of a received signal at a moment previous to the predetermined moment, and determining a probability of conversion from a decoding mode at the moment previous to the predetermined moment to the predetermined decoding mode at the predetermined moment; and
    substituting the posterior probability of each decoding mode and the probability of conversion into the logarithmic priori probability formula to obtain a logarithmic priori probability of the decoding mode of the in-band signaling of the received signal at the predetermined moment.

3. The method for determining a decoding mode of in-band signaling according to claim 2, wherein after taking the logarithms of the two sides of the priori probability calculation formula acquired by an acquiring sub-module to obtain the logarithmic priori probability formula of the decoding mode of the in-band signaling of the received signal at the predetermined moment, the method further comprises:
    further simplifying the logarithmic priori probability formula according to data sending characteristics of the in-band signaling to obtain a simplified logarithmic priori probability calculation formula:

$$\ln p(st_k=0)=\max(\ln p_{00}+\ln p(st_{k-1}=0|r_{k-1})\ln p_{10}+\ln p(st_{k-1}=1|r_{k-1}))$$

$$\ln p(st_k=1)=\max(\ln p_{01}+\ln p(st_{k-1}=0|r_{k-1})\ln p_{11}+\ln p(st_{k-1}=1|r_{k-1})\ln p_{21}+\ln p(st_{k-1}=2|r_{k-1}))$$

$$\ln p(st_k=2)=\max(\ln p_{12}+\ln p(st_{k-1}=1|r_{k-1})\ln p_{22}+\ln p(st_{k-1}=2|r_{k-1})\ln p_{32}+\ln p(st_{k-1}=3|r_{k-1}))$$

$$\ln p(st_k=3)=\max(\ln p_{23}+\ln p(st_{k-1}=2|r_{k-1})\ln p_{33}+\ln p(st_{k-1}=3|r_{k-1}))$$

wherein $st_k=m$, $m=0, 1, 2, 3$, which is one of four in-band signaling decoding modes at the moment k, and $r_k$ is the received signal vector; and substituting the posterior probability of each decoding mode and the probability of conversion that are obtained through calculation into the simplified logarithmic priori probability formula to obtain a logarithmic priori probability of the decoding mode of the in-band signaling of the received signal at the predetermined moment.

4. The method for determining a decoding mode of in-band signaling according to claim 2, wherein after taking the logarithms of the two sides of the priori probability calculation formula acquired by an acquiring sub-module to obtain the logarithmic priori probability formula of the decoding mode of the in-band signaling of the received signal at the predetermined moment, the method further comprises:

obtaining the following logarithmic priori probability calculation formula according to data sending characteristics of the in-band signaling and according to the logarithmic priori probability formula:

$$\ln p(st_k=0)=\max(\ln p_{00}+\ln p(st_{k-1}=0|r_{k-1})\ln p_{10}+\ln p(st_{k-1}=1|r_{k-1})\ln p_{20}+\ln p(st_{k-1}=2|r_{k-1})\ln p_{30}+\ln p(st_{k-1}=3|r_{k-1}))$$

$$\ln p(st_k=1)=\max(\ln p_{01}+\ln p(st_{k-1}=0|r_{k-1})\ln p_{11}+\ln p(st_{k-1}=1|r_{k-1})\ln p_{21}+\ln p(st_{k-1}=2|r_{k-1})\ln p_{31}+\ln p(st_{k-1}=3|r_{k-1}))$$

$$\ln p(st_k=2)=\max(\ln p_{02}+\ln p(st_{k-1}=0|r_{k-1})\ln p_{12}+\ln p(st_{k-1}=1|r_{k-1})\ln p_{22}+\ln p(st_{k-1}=2|r_{k-1})\ln p_{32}+\ln p(st_{k-1}=3|r_{k-1}))$$

$$\ln p(st_k=3)=\max(\ln p_{03}+\ln p(st_{k-1}=0|r_{k-1})\ln p_{13}+\ln p(st_{k-1}=1|r_{k-1})\ln p_{32}+\ln p(st_{k-1}=2|r_{k-1})\ln p_{33}+\ln p(st_{k-1}=3|r_{k-1}))$$

wherein $st_k=m$, $m=0, 1, 2, 3$, which is one of four in-band signaling decoding modes at the moment k, and $r_k$ is the received signal vector; and substituting the posterior probability of each decoding mode and the probability of conversion that are obtained through calculation into the simplified logarithmic priori probability formula to obtain a logarithmic priori probability of the decoding mode of the in-band signaling of the received signal at the predetermined moment.

5. The method for determining a decoding mode of in-band signaling according to claim 2, wherein calculating the posterior probability of each decoding mode of the in-band signaling of the received signal at the moment previous to the predetermined moment comprises:

specifying a decoding mode of the in-band signaling of the received signal at the moment previous to the predetermined moment;

setting a posterior probability of the specified decoding mode to 1, and setting posterior probabilities of decoding modes other than the specified decoding mode to 0; or calculating, according to a posterior probability principle, the posterior probability of each decoding mode of the in-band signaling of the received signal at the moment previous to the predetermined moment.

6. A device for determining a decoding mode of in-band signaling, the device comprising:

a calculating unit, configured to calculate a probability of each decoding mode of in-band signaling of a received signal at a predetermined moment by using a posterior probability algorithm; and a selecting unit, configured to select, from calculated probabilities of decoding modes, a decoding mode having a maximum probability value as a decoding mode of the in-band signaling of the received signal at the predetermined moment.

7. A device for determining a decoding mode of in-band signaling according to claim 6, wherein the calculating unit comprises:

a formula acquiring module, configured to obtain, according to a posterior probability principle, a probability formula for calculating the probability of the decoding mode of the in-band signaling of the received signal at the predetermined moment:

$$p(st_k=m|r_k)=\frac{p(r_k|st_k=m)p(st_k=m)}{p(r_k)}$$

wherein $st_k=m$, $m=0, 1, 2, 3$, which is one of four in-band signaling decoding modes at a moment k, and $r_k$ is a received signal vector;

a formula simplifying module, configured to take logarithms of two sides of the probability formula acquired by the formula acquiring module, and simplify the probability formula according to a relationship between the received signal and a demodulated soft value to obtain a simplified probability formula:

$$\ln p(st_k=m|r_k) \Leftrightarrow \frac{\sum_{i=0}^{3}\lambda_{ki}s_{ki}}{2}+\ln p(st_k=m)$$

wherein $st_k=m$, $m=0, 1, 2, 3$, which is one of four in-band signaling decoding modes at the moment k, $\lambda$ a demodulated soft value of the received signal, and s is encoded data of a sent signal, and a calculating module, configured to calculate a logarithmic priori probability of the decoding mode of the in-band signaling of the received signal at the predetermined moment, and substitute the logarithmic priori probability into the probability formula simplified by the formula simplifying module to obtain a probability of a corresponding decoding mode of the received signal at the predetermined moment.

8. A device for determining a decoding mode of in-band signaling according to claim 7, wherein the calculating module comprises:

an acquiring sub-module, configured to obtain a priori probability calculation formula of a predetermined decoding mode of the in-band signaling of the received signal at the predetermined moment according to a priori probability algorithm:

$$p(st_k=m)=p_{0m}p(st_{k-1}=0|r_{k-1})+p_{1m}p(st_{k-1}=1|r_{k-1})+p_{2m}p(st_{k-1}=2|r_{k-1})+p_{3m}p(st_{k-1}=3|r_{k-1})$$

wherein $r_k$ is a received signal vector, $st_{k-1}=m$, $st_k=m$, $m=0, 1, 2, 3$, $st_k$ is one of four in-band signaling decoding modes at a moment k, $st_{k-1}$ is one of four in-band signaling decoding modes at a moment k-1, $P_{0m}$, $P_{1m}$, $P_{2m}$, and $P_{3m}$ are respectively probabilities of conversion from four decoding modes 0, 1, 2, and 3 at the moment k-1 to mode m at the moment k, and $p(st_k=m)$ is a priori probability when the decoding mode at the moment k is mode m;

a first calculating sub-module, configured to take logarithms of two sides of the priori probability calculation formula to obtain a logarithmic priori probability formula of the decoding mode of the in-band signaling of the received signal at the predetermined moment:

$$\ln p(st_k=m)=\max(\ln p_{0m}+\ln p(st_{k-1}=0|r_{k-1}), \ln p_{1m}+\ln p(st_{k-1}=1|r_{k-1}),$$

$$\ln p_{2m}+\ln p(st_{k-1}=2|r_{k-1}), \ln p_{3m}+\ln p(st_{k-1}=3|r_{k-1}))$$

wherein $st_k=m$, $m=0, 1, 2, 3$, which is one of four in-band signaling decoding modes at the moment k, and $r_k$ is the received signal vector;

a second calculating sub-module, configured to calculate a posterior probability of each decoding mode of in-band signaling of a received signal at a moment previous to the predetermined moment, and determine a probability of conversion from a decoding mode at the moment previous to the predetermined moment to the predetermined decoding mode at the predetermined moment; and a third calculating sub-module, configured to substitute the posterior probability of each decoding mode and the probability of conversion that are calculated by the second calculating sub-module into the logarithmic priori probability formula to obtain a logarithmic priori probability of the decoding mode of the in-band signaling of the received signal at the predetermined moment.

9. A device for determining a decoding mode of in-band signaling according to claim 8, wherein the calculating module further comprises:

a formula simplifying sub-module, configured to, after the taking the logarithms of the two sides of the priori probability calculation formula obtained by the acquiring sub-module to obtain the logarithmic priori probability formula of the decoding mode of the in-band signaling of the received signal at the predetermined moment, further simplify the logarithmic priori probability formula according to data sending characteristics of the in-band signaling to obtain the simplified logarithm priori probability calculation formula:

$$\ln p(st_k=0)=\max(\ln p_{00}+\ln p(st_{k-1}=0|r_{k-1}) \ln p_{10}+\ln p(st_{k-1}=1|r_{k-1}))$$

$$\ln p(st_k=1)=\max(\ln p_{01}+\ln p(st_{k-1}=0|r_{k-1}) \ln p_{11}+\ln p(st_{k-1}=1|r_{k-1}) \ln p_{21}+\ln p(st_{k-1}=2|r_{k-1}))$$

$$\ln p(st_k=2)=\max(\ln p_{12}+\ln p(st_{k-1}=1|r_{k-1}) \ln p_{22}+\ln p(st_{k-1}=2|r_{k-1}) \ln p_{32}+\ln p(st_{k-1}=3|r_{k-1}))$$

$$\ln p(st_k=3)=\max(\ln p_{23}+\ln p(st_{k-1}=2|r_{k-1}) \ln p_{33}+\ln p(st_{k-1}=3|r_{k-1}))$$

wherein $st_k=m$, $m=0, 1, 2, 3$, which is one of four in-band signaling decoding modes at the moment k, and $r_k$ is the received signal vector; and the third calculating sub-module is further configured to substitute the posterior probability of each decoding mode and the probability of conversion that are calculated by the second calculating sub-module into the logarithmic priori probability formula simplified by the simplifying module to obtain a logarithmic priori probability of the decoding mode of the in-band signaling of the received signal at the predetermined moment.

10. A device for determining a decoding mode of in-band signaling according to claim 8, wherein the calculating module further comprises:

a fourth calculating sub-module, configured to, after the taking the logarithms of the two sides of the priori probability calculation formula obtained by the acquiring sub-module to obtain the logarithmic priori probability formula of the decoding mode of the in-band signaling of the received signal at the predetermined moment, obtain the following logarithmic priori probability calculation formula according to data sending characteristics of the in-band signaling and the logarithmic priori probability formula:

$$\ln p(st_k=0)=\max(\ln p_{00}+\ln p(st_{k-1}=0|r_{k-1})\ln p_{10}+\ln p(st_{k-1}=1|r_{k-1})\ln p_{20}+\ln p(st_{k-1}=2|r_{k-1})\ln p_{30}+\ln p(st_{k-1}=3|r_{k-1}))$$

$$\ln p(st_k=1)=\max(\ln p_{01}+\ln p(st_{k-1}=0|r_{k-1})\ln p_{11}+\ln p(st_{k-1}=1|r_{k-1})\ln p_{21}+\ln p(st_{k-1}=2|r_{k-1})\ln p_{31}+\ln p(st_{k-1}=3|r_{k-1}))$$

$$\ln p(st_k=2)=\max(\ln p_{02}+\ln p(st_{k-1}=0|r_{k-1})\ln p_{12}+\ln p(st_{k-1}=1|r_{k-1})\ln p_{22}+\ln p(st_{k-1}=2|r_{k-1})\ln p_{32}+\ln p(st_{k-1}=3|r_{k-1}))$$

$$\ln p(st_k=3)=\max(\ln p_{03}+\ln p(st_{k-1}=0|r_{k-1})\ln p_{13}+\ln p(st_{k-1}=1|r_{k-1})\ln p_{32}+\ln p(st_{k-1}=2|r_{k-1})\ln p_{33}+\ln p(st_{k-1}=3|r_{k-1}))$$

wherein $st_k=m$, $m=0, 1, 2, 3$, which is one of four in-band signaling decoding modes at the moment k, and $r_k$ is the received signal vector, and the third calculating sub-module is further configured to substitute the posterior probability of each decoding mode and the probability of conversion that are calculated by the second calculating sub-module into the logarithmic priori probability formula simplified by the simplifying module to obtain a logarithmic priori probability of the decoding mode of the in-band signaling of the received signal at the predeteimined moment.

11. A device for determining a decoding mode of in-band signaling according to claim 8, wherein the first calculating sub-module comprises:

specifying a decoding mode of the in-band signaling of the received signal at the moment previous to the predetermined moment;

setting a posterior probability of the specified decoding mode to 1, and setting posterior probabilities of decoding modes other than the specified decoding mode to 0; or calculating, according to a posterior probability principle, a posterior probability of each decoding mode of the in-band signaling of the received signal at the moment previous to the predetermined moment.

* * * * *